(12) United States Patent
Ionasec et al.

(10) Patent No.: US 9,547,902 B2
(45) Date of Patent: Jan. 17, 2017

(54) METHOD AND SYSTEM FOR PHYSIOLOGICAL IMAGE REGISTRATION AND FUSION

(75) Inventors: Razvan Ionasec, Lawrenceville, NJ (US); Bogdan Georgescu, Plainsboro, NJ (US); Yefeng Zheng, Dayton, NJ (US); Dorin Comaniciu, Princeton Junction, NJ (US)

(73) Assignee: Siemens Healthcare GmbH, Erlangen (DE)

( * ) Notice: Subject to any disclaimer, the term of this patent is extended or adjusted under 35 U.S.C. 154(b) by 1281 days.

(21) Appl. No.: 12/562,483

(22) Filed: Sep. 18, 2009

(65) Prior Publication Data

US 2010/0067768 A1 Mar. 18, 2010

Related U.S. Application Data (60) Provisional application No. 61/097,969, filed on Sep. 18, 2008.

(51) Int. Cl.
G06K 9/00 (2006.01)
G06T 7/00 (2006.01)
G06K 9/62 (2006.01)

(52) U.S. Cl.
CPC .......... G06T 7/0034 (2013.01); G06K 9/621 (2013.01); G06T 7/0032 (2013.01); *G06K 2209/05* (2013.01)

(58) Field of Classification Search
CPC ...... G06K 9/621; G06T 7/0032; G06T 7/0034
See application file for complete search history.

(56) References Cited

U.S. PATENT DOCUMENTS

| | | | |
|---|---|---|---|
| 7,117,026 B2 * | 10/2006 | Shao et al. | 600/411 |
| 7,450,780 B2 | 11/2008 | Roche et al. | |
| 2003/0208116 A1 * | 11/2003 | Liang et al. | 600/407 |
| 2006/0004274 A1 | 1/2006 | Hawman | |
| 2006/0004275 A1 | 1/2006 | Vija et al. | |
| 2007/0081712 A1 * | 4/2007 | Huang et al. | 382/128 |
| 2007/0167801 A1 * | 7/2007 | Webler et al. | 600/459 |
| 2008/0101676 A1 * | 5/2008 | Zheng et al. | 382/131 |
| 2008/0205790 A1 * | 8/2008 | Wear et al. | 382/284 |
| 2008/0265166 A1 * | 10/2008 | Shekhar et al. | 250/363.03 |
| 2009/0046914 A1 * | 2/2009 | Khazen et al. | 382/131 |
| 2009/0123050 A1 | 5/2009 | Ionasec et al. | |

OTHER PUBLICATIONS

Ionasec, Razvan Ioan et al., "Dynamic Model-Driven Quantitative and Visual Evaluation of the Aortic Valve from 4D CT", Int'l Conference on Medical Image Computing and Computer-Assisted Intervention, 11(Pt 1), 2008.

(Continued)

*Primary Examiner* — Elaine Gort
*Assistant Examiner* — Trang Nguyen (57) ABSTRACT

A method and system for physiological image registration and fusion is disclosed. A physiological model of a target anatomical structure in estimated each of a first image and a second image. The physiological model is estimated using database-guided discriminative machine learning-based estimation. A fused image is then generated by registering the first and second images based on correspondences between the physiological model estimated in each of the first and second images.

28 Claims, 5 Drawing Sheets

(56) References Cited

OTHER PUBLICATIONS

Yang, Lin et al., "3D UltraSound Tracking of the Left Ventricles Using One-Step Forward Prediction and Data Fusion of Collaborative Trackers", CVPR, 2008.

Zheng, Yefeng, et al., "Four-Chamber Heart Modeling and Automatic Segmentation for 3D Cardiac CT Volumes Using Marginal Space Learning and Steerable Features", IEEE Transactions on Medical Imaging, 27(11), Nov. 2008.

\* cited by examiner

METHOD AND SYSTEM FOR PHYSIOLOGICAL IMAGE REGISTRATION AND FUSION

This application claims the benefit of U.S. Provisional Application No. 61/097,969, filed Sep. 18, 2008, the disclosure of which is herein incorporated by reference.

BACKGROUND OF THE INVENTION

The present invention relates to physiological image registration and fusion, and more particularly, to fusing multiple medical images of anatomical structures using physiological models of related structures.

Various imaging modalities, such as computed tomography (CT), magnetic resonance (MR), ultrasound, positron emission tomography (PET), single photon emission computed tomography (SPECT), etc., are used to generate medical images of anatomic structures. The physiological information provided by various types of imaging modalities is often vital throughout a clinical workflow, which includes diagnosis, planning, and evaluation of surgical and radiotherapeutical procedures. Information gained from two or more images acquired using different imaging modalities is often complementary, and can provide additional and critical clinical value. Thus, methods for integrating such information from different imaging modalities are desirable.

Conventional techniques for registering different images utilize image-based methods in which a measure of similarity if defined together with a set of allowed rigid/non-rigid transformations and optimization is used to maximize the similarity measure subject to the allowed transformations. Such a similarity measure, applied in multi-modal registration, is typically based on mutual intensity information in the images. Mutual intensity information becomes very complex for high dimensional multi-modal registration problems, which leads to long processing time and poor results. Accordingly, although conventional registration techniques have achieved limited success in two-dimensional monomodal and widely rigid anatomical regions, such techniques have not been widely adopted in multi-modal registration of higher dimensional images.

BRIEF SUMMARY OF THE INVENTION

The present invention provides a method and system for physiological image registration and fusion. Embodiments of the present invention fit a physiological model of an anatomic structure learned from a database to multiple images to be fused, and register the images by generating correspondences to the estimated models in the images. Accordingly, embodiments of the present invention exploit high-level prior knowledge of the underlying physiology in order to provide an accurate and robust alignment of the target images.

In one embodiment of the present invention, a physiological model of a target anatomical structure is estimated in each of a first image and a second image. The physiological model can be estimated using database-guided discriminative machine learning-based estimation. A fused image is then generated by registering the first and second images based on correspondences between the physiological model estimated in each of the first and second images.

These and other advantages of the invention will be apparent to those of ordinary skill in the art by reference to the following detailed description and the accompanying drawings.

DETAILED DESCRIPTION

The present invention relates to physiological image registration and fusion in medical images. Embodiments of the present invention are described herein to give a visual understanding of the image registration and fusion method. A digital image is often composed of digital representations of one or more objects (or shapes). The digital representation of an object is often described herein in terms of identifying and manipulating the objects. Such manipulations are virtual manipulations accomplished in the memory or other circuitry/hardware of a computer system. Accordingly, is to be understood that embodiments of the present invention may be performed within a computer system using data stored within the computer system.

Embodiments of the present invention are directed to a method for image fusion having two phases: database-guided model estimation and physiological image registration and fusion. In the first phase, a physiological model of a target anatomic structure is fitted to various images to be fused, such as images generated using different imaging modalities, using data-guided methods. In the second phase, the registration of the images is performed by exploiting the spatial and temporal correspondence provided by the estimated physiological model in the images.

The physiological model of the anatomic structure is constructed offline prior to the image registration and fusion. The physiological model is generated based on a mathematical representation of the target anatomic structure in a set of annotated training data. The physiological model represents anatomic structures and topological relationships between the anatomic structures. The physiological model must provide correspondence either explicitly through a chosen representation or implicitly by defining an adequate sampling method to allow the model to be registered to an image. For example, United States Patent Application Publication No. 2008/0101676, which is incorporated herein by reference, describes a generating a four-chamber physiological heart model and fitting the heart model to image data. As described therein, the heart model is a 3D mesh and initial meshes for each chamber are generated using mean shapes of the chambers in annotated training data. Although such a heart model used herein to illustrate embodiments of the present invention, the present invention is not limited thereto and other models and anatomic structures can be used. For example, United States Patent Application No. 2009/0123050, which is incorporated herein by reference, describes a 4D physiological model of the aortic valve.

Figure 1:
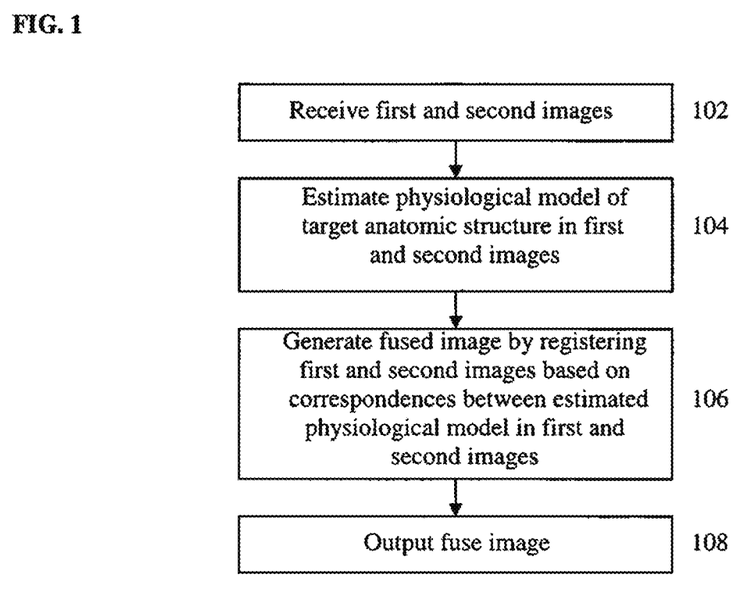
FIG. 1 illustrates a method of physiological image registration and fusion in medical images according to an embodiment of the present invention.

FIG. 1 illustrates a method of physiological image registration and fusion in medical images according to an embodiment of the present invention. The method of FIG. 1 transforms image data representing a target anatomical structure in order to register two images to fuse the information in the images based on a physiological model of the target anatomical structure.

As illustrated in FIG. 1, at step 102, first and second medical images are received. The first and second medical images include a common target anatomic structure. Each of the first and second medical images can be 3D or 4D medical images generated using any type of image modality, such as computed tomography (CT), magnetic resonance (MR), ultrasound, positron emission tomography (PET), single photon emission computed tomography (SPECT), etc. As used herein, a 4D image is a dynamic sequence of 3D images taken over a certain time period. According to one embodiment of the present invention, the first and second medical images can be generated using different imaging modalities, but the present invention is not limited thereto. The first and second medical images can be received directly from image acquisition devices corresponding to their respective imaging modalities (e.g., CT scanner, MR scanner, etc.). It is also possible that one or both of the first and second medical images can received by loading previously stored images from a memory or storage of a computer system or some other computer readable storage medium.

At step 104, a physiological model of the target anatomic structure is estimated independently in each of the first and second medical images. In order to estimate the physiological model in each of the first and second images, the parameters of the physiological model are estimated to fit each image using a discriminative machine-learning technique based on a large database of annotated training images. According to one embodiment, marginal space learning (MSL) is used to localize the physiological model in each of the first and second images.

The idea of MSL is not to learn a classifier directly in a full similarity transformation parameter space, but to incrementally learn discriminative classifiers in increasing dimensionality based on annotated training data. As the dimensionality increases, the valid (positive) space region becomes more restricted by previous marginal space classifiers. In order to estimate a physiological model of an anatomic structure, such as a particular heart chamber, in an image, the estimation of the similarity transformation (i.e., position, orientation, and scale) corresponding to the location of the chamber can be split into three stages: position estimation, position-orientation estimation, and full similarity transformation estimation. A discriminative classifier is trained for each stage based on the training data. All of the discriminative classifiers can be trained as Probabilistic Boosting Trees (PBTs). In addition to reducing the size of the search space, another advantage of MSL is that it is possible to use different features, such as 3D Haar features or steerable features to train the classifier in each marginal space level.

Examples of estimating physiological models in various types of image modalities are described in the following publications, the disclosures of which are incorporated herein by reference: United States Patent Application Publication No. 2008/0101676, which describes fitting a four chamber heart model to 3D CT image data; United States Patent Application No. 2009/0123050, which describes fitting a physiological model of the aortic valve to 4D CT data; and Yang et al., "3D Ultrasound Tracking of the Left Ventricles Using One-Step Forward Prediction and Data Fusion of Collaborative Trackers", CVPR 2008, which describes fitting a model of the left ventricle to a sequence of 3D ultrasound image. It is to be understood that the above examples are not intended to limit the invention, and any physiological model that is fit to image data using discriminative machine-learning techniques can be used.

Once the parameters of the physiological model are estimated for each of the first and second images, e.g., using MSL, learning-based boundary detection can be performed on the physiological model in each image to refine the estimated model parameters. In particular, the boundary of the estimated model in each image can be refined using the learning-based boundary detection to increase the accuracy of the physiological model estimation.

At step 106, a fused image is generated by registering the first and second medical images based on correspondences between the estimated physiological model in the first and second medical images. This image registration step uses the correspondence provided by the fitted physiological models in the images to establish the spatial and temporal alignment of the underlying images. Given M images, e.g. from various imaging modalities, and R points defined in a N+1 dimensional space, which represent each fitted model, the correspondence vector V is expressed as follows:

$$V=\{\{(x_1, \ldots, x_N, t)^1, \ldots, (x_1 \ldots x_N, t)^M\}_i, 0 \le i < R\}. \quad (1)$$

A transformation T defines the type of mapping between input images M, and its parameters are determined from the correspondence vector V. For various transformation types, the estimation of T is a well-studied problem with existent closed form solutions in the least square sense, including rigid, similarity and linear combination of basis functions (e.g., splines). The image registration step is independent of any particular type of transformation and any well-known transformation can be used.

According to one particular embodiment, the transformation T can be estimated based on correspondence vector V as a thin-plate-spline (TPS) transformation. Given a set $K=\{(L_i^m, L_i^d), L_i^m \in M, L_i^d \in D, 0 < i \le N\}$, which includes pairs of corresponding points (control points), the TPS defines a coordinate transformation $T_{TPS}$, which maps each point in image M to a corresponding location in image D. For d dimensional domains M and D, the transformation includes d(d+1) global affine parameters and d|K| local non-affine components:

$$P_i^d = T_{TPS}(P_i^m) \quad (2)$$

$$T_{TPS}(P_i^m) := \begin{bmatrix} A & b \\ 0 \ldots 0 & 1 \end{bmatrix} \begin{bmatrix} P_i^m \\ 1 \end{bmatrix} + \begin{bmatrix} \sum_{i=1}^{n} w_i U(|L_i^m - P_i^m|) \\ 0 \end{bmatrix}$$

where A and b are the affine parameters, $\omega_i$ the non-affine parameters, U the TPS basis function, and $L_i^m$ the predefined landmarks. The non-affine part of Equation (2) is a radial basis function. In the case of TPS, the kernel U is the thin-plate-spline function defined as:

$$U(r) = r^2 \log r^2 \quad (3)$$

The coefficients A, b, and $\omega_i$, which define the TPS transformation $T_{TPS}$ in Equation (2) are selected to minimize the bending energy function E of a hypothetical thin metal plate. In the two dimensional case, E is defined as follows:

$$\int\int_{R^2} \left(\frac{\partial^2 T_{TPS}}{\partial x^2}\right)^2 + 2\left(\frac{\partial^2 T_{TPS}}{\partial x \partial y}\right)^2 + \left(\frac{\partial^2 T_{TPS}}{\partial y^2}\right)^2 dx dy. \quad (4)$$

TPS has a closed form solution where the parameters are obtained by solving a linear system. Accordingly, TPS can be used to provide a suitable transformation to implement the non-rigid registration of the images based on the correspondences (e.g., corresponding control points) in the physiological models independently fit to the images.

At step 108, the fused image is output. The fused image resulting from step 106 can be output by displaying the fused image on a display of a computer system. The fused image combines information in each of the first and second images. The fused image may also be output by storing the fused image, for example on a storage or memory of a computer system or other computer readable storage medium.

Figure 2:
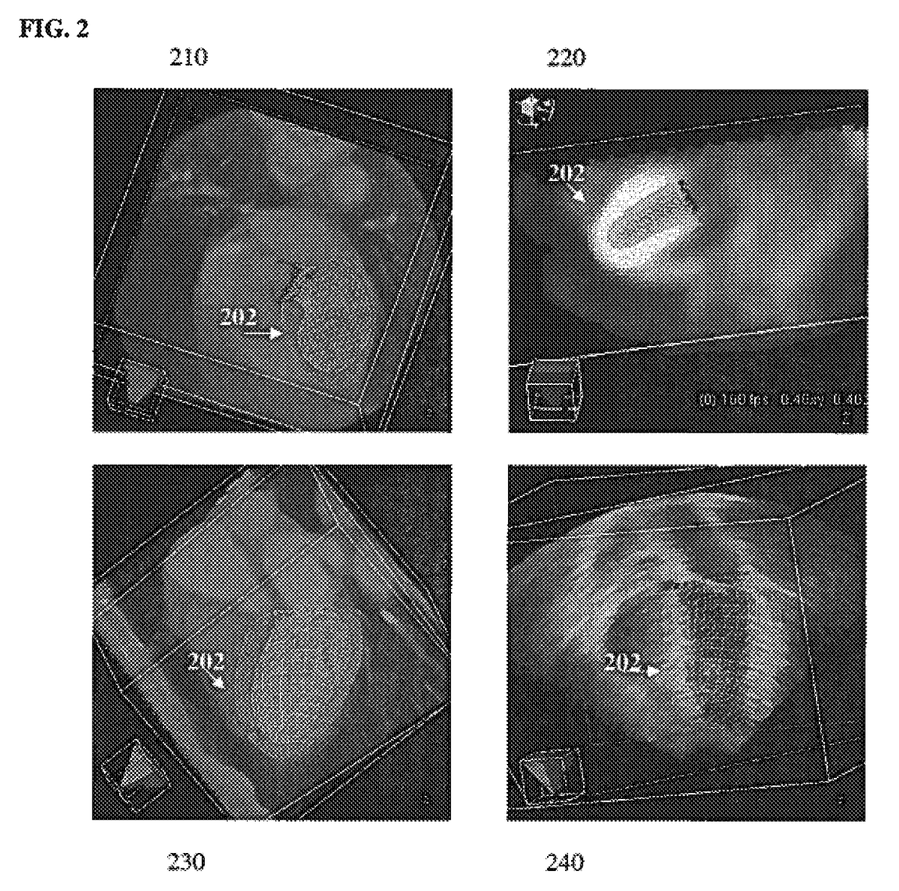
FIG. 2 illustrates examples of data-base guided model estimation of a physiological model of the left ventricle in various imaging modalities.

In one embodiment of the present invention, the method of FIG. 1 can be used for multi-modal image registration and fusion. In this case, two or more images of a target anatomic structure generated using different imaging modalities can be registered using the method of FIG. 1. One possible use for such multi-modal image registration is the registration and fusion of structural data and nuclear data obtained via radiological exams and nuclear medicine, respectively. This allows for accurate correlation of anatomical and functional information. Imaging modalities include, but are not limited to PET and SPECT (functional), and CT, DynaCT, MAI and Ultrasound (structural). FIG. 2 illustrates examples of database-guided model estimation (step 104) of a physiological model of the left ventricle in various imaging modalities. As shown in FIG. 2 the left ventricle model 202 is fit to a DynaCT image 210, a SPECT image 220, a CT image 230, and an ultrasound transthoracic echocardiogram (TIE) image 240. In addition to structural to function image fusion, the method of FIG. 1 can also be used for pre-operative to post-operative image fusion to allow for effective therapeutic outcome quantification. Examples of such fusion include 3D MR to 3D MR, 3D MR to 4D CT, and 4D CT to 4D CT.

Figure 3:
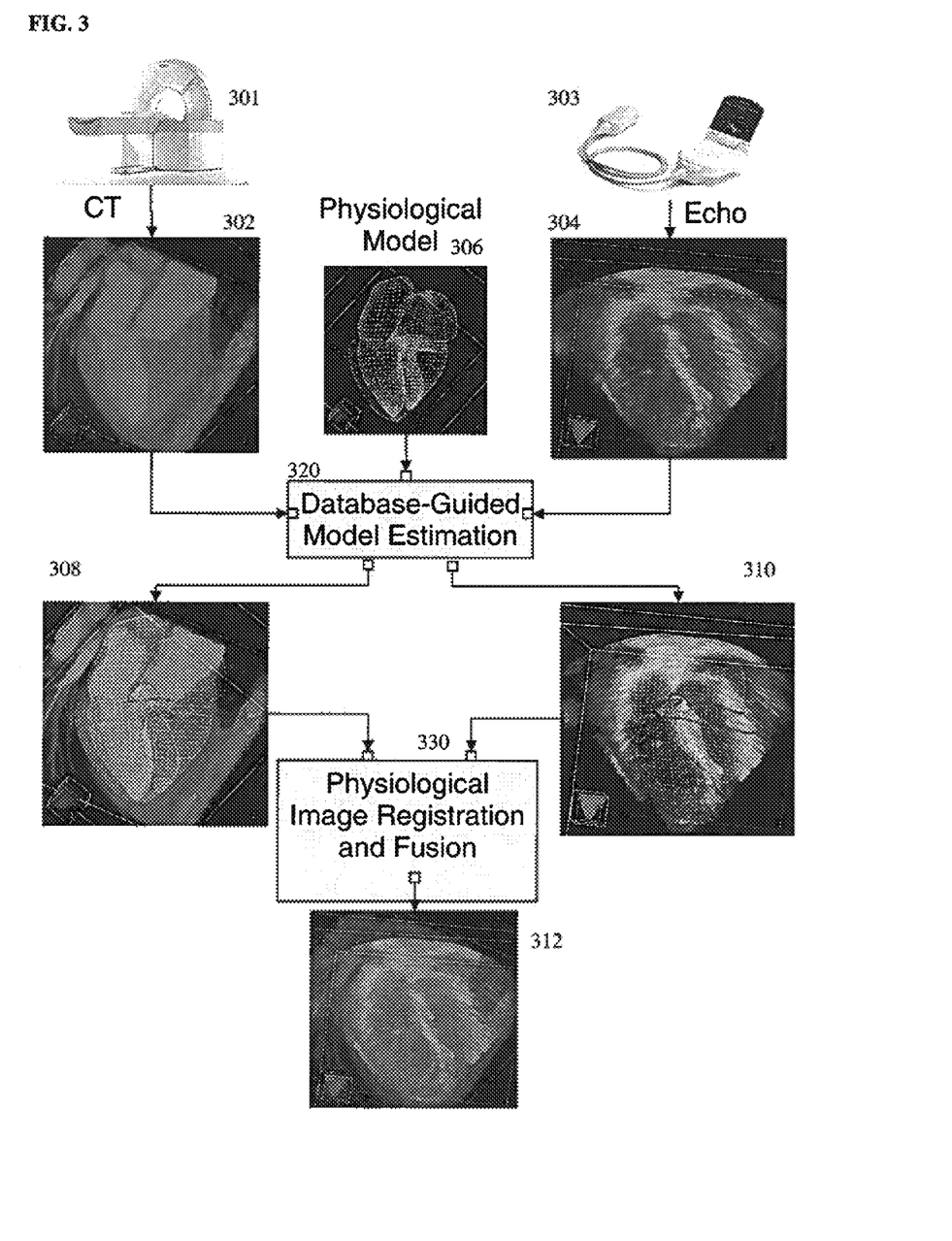
FIG. 3 illustrates registration and fusion of multi-modal images using the method of FIG. 1 according to an embodiment of the present invention.

FIG. 3 illustrates registration and fusion of multi-modal images using the method of FIG. 1 according to an embodiment of the present invention. As illustrated in FIG. 3, the first image 302 is a CT image received from a CT scanning device 301 and the second image 304 is a, echo (Doppler echocardiogram) image received from an ultrasound device 303. In the database-guided model estimation step 320, a physiological four chamber heart model 306 is independently estimated in each of the CT image 302 and the echo image 304. Image 308 shows the physiological heart model 306 fit to the CT image 302 and image 310 shows the physiological heart model 306 fit to the echo image 304. The database-guided model estimation estimates the heart model 306 in the CT image 302 and the echo image 304 using a discriminative machine-learning based technique such as MSL, as described above in connection with step 104 of FIG. 1. In the physiological image registration and fusion step 330, the CT image 302 and the echo image 304 are registered based on corresponding control points of the physiological heart model 306 estimated in each of the CT image 302 and the echo image 304. As described above in connection with step 106 of FIG. 1, a transformation is calculated between the control points of the model 306 estimated in each of the images 302 and 304 to register the images 302 and 304. This results in a fused image 312 that combines the image information of the CT image 302 and the echo image 302.

According to another embodiment of the present invention, the method of FIG. 1 can be modified to perform real-time model estimation and fusion using a multi-modal physiological prior. Pre- to intra-operative fusion performed in real-time can optimize critical decisions during surgery or intervention by integrating a previously acquired high resolution images with real-time lower quality data obtained in real-time during an operation. A physiological model can be fitted to data (e.g., CT or MRI) acquired in a planning stage before an operation. Subsequently, the database-guided model estimation performed on intra-operative data exploits the previously determined model parameters as a prior, leading to a significant reduction in computation time and enabling real-time processing. Clinical scenarios can include 4D CT to 4D real-time ultrasound and 3D (DynaCT) to 4D ultrasound.

Figure 4:
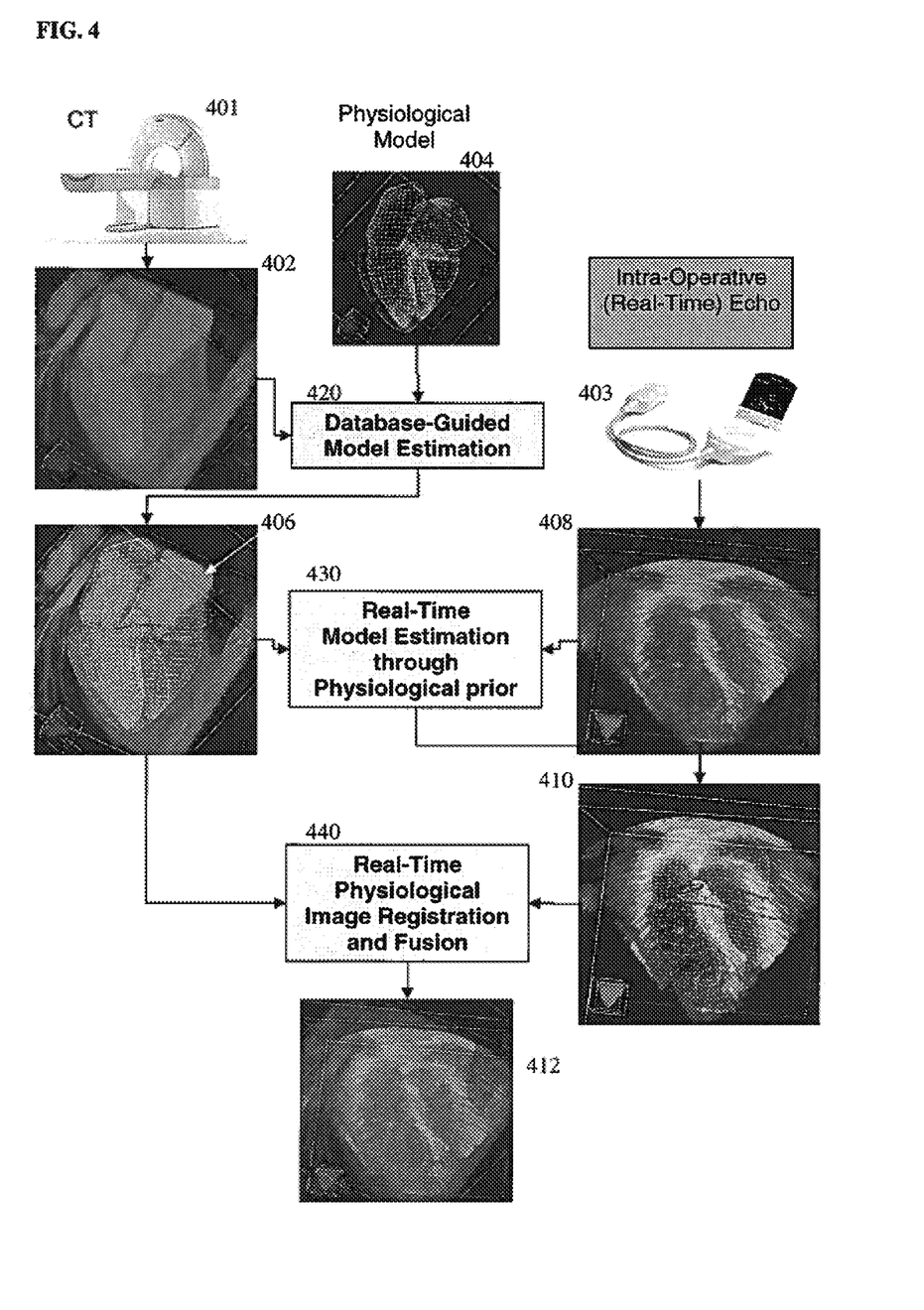
FIG. 4 illustrates real-time physiological model estimation and fusion using a multi-modal physical prior according to an embodiment of the present invention.

FIG. 4 illustrates real-time physiological model estimation and fusion using a multi-modal physical prior according to an embodiment of the present invention. As illustrated in FIG. 4, a CT image 402 is received from a CT scanner 401 in advance of an operation. The CT image 402 can be a high resolution CT image. A physiological four chamber heart model 404 is estimated in the CT image 402 using database-guided model estimation (420), as described above in connection with step 104 of FIG. 1. This results in a patient specific heart model 406, the parameters of which are fit to the patient specific CT image 402, which functions as a physiological prior for real-time model estimation and fusion. In the real-time model estimation through physiological prior step 430, as a dynamic sequence of echo images 408 are received in real-time from an ultrasound device 403 during an operation, the patient specific heart model 406 is estimated in each echo image 408 (i.e., each frame of the dynamic image sequence). The patient specific heart model 406 is estimated to each echo image 408 using database-guided model estimation as described above in connection with step 104 of FIG. 1. Because the patient specific heart model 406 has previously been fit to patient specific data in the CT image 402, only the position, orientation, and scale of the model 406 (no application specific deformation) must be estimated in each echo image 408. This leads to a significant reduction in computation time, which enables real-time processing. Image 410 shows the patient specific model 406 estimated in an echo image 408. In the real-time physiological image registration and fusion step 440, once the patient specific model 406 is estimated in real-time for an echo image 408, the echo image 408 can be fused with the CT image 402 as described above in connection with step 106 of FIG. 1. This results in a fused image 412 which is obtained in real-time and includes the image information of the CT image 402 and the echo image 408.

In another embodiment, the method of FIG. 1 can be used to register multiple images of a patient generated using the same imaging modality as a different time for physiological image fusion based change detection. In this case, knowledge of the underlying imaged anatomy can help guide the registration process according to the region of interest in the images. For example, in a change detection quantification scenario to analyze the effect of a treatment to a target region of interest, the registration can be guided based on anatomical structures that are not affected by the treatment and the analysis can be targeted at the target region interest.

Figure 5:
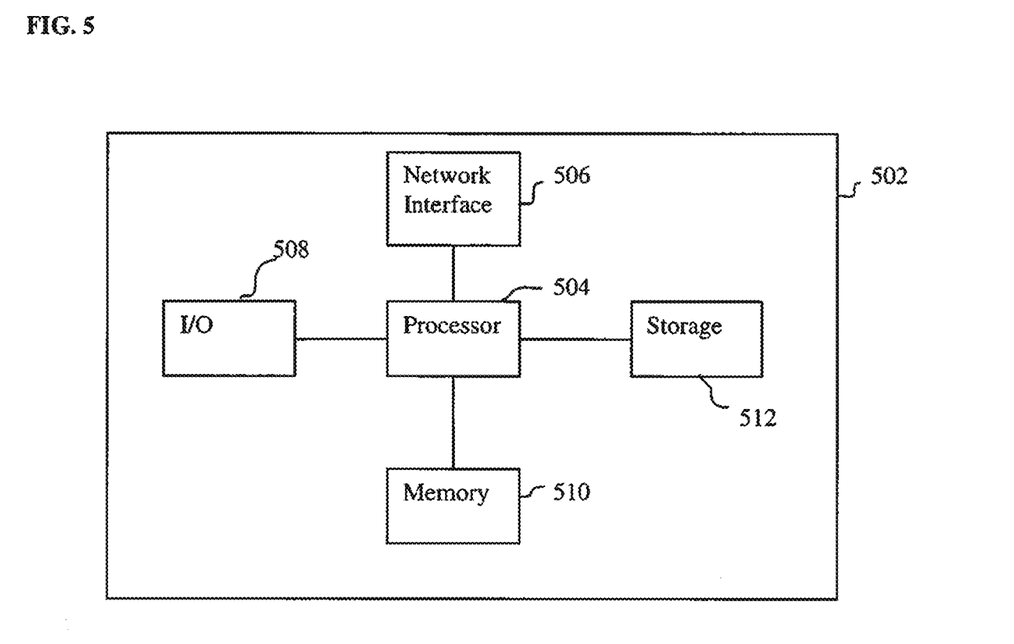
FIG. 5 is a high-level block diagram of a computer capable of implementing the present invention.

The above-described methods for physiological image registration and fusion may be implemented on a computer using well-known computer processors, memory units, storage devices, computer software, and other components. A high-level block diagram of such a computer is illustrated in FIG. 5. Computer 502 contains a processor 904, which controls the overall operation of the computer 502 by executing computer program instructions which define such operation. The computer program instructions may be stored in a storage device 512 (e.g., magnetic disk) and loaded into memory 510 when execution of the computer program instructions is desired. Thus, the steps of the method of FIGS. 1, 3, and 4 may be defined by the computer program instructions stored in the memory 510 and/or storage 512 and controlled by the processor 504 executing the computer program instructions. The computer 502 may be connected to one or more image acquisition devices in order receive images generated using one or more imaging modalities. The computer 502 also includes one or more network interfaces 506 for communicating with other devices via a network. The computer 502 also includes other input/output devices 508 that enable user interaction with the computer 502 (e.g., display, keyboard, mouse, speakers, buttons, etc.). One skilled in the art will recognize that an implementation of an actual computer could contain other components as well, and that FIG. 5 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for physiological registration and fusion of multiple images, comprising:
   independently estimating a respective physiological model of a target anatomical structure in each of a first image and a second image; and
   generating a fused image by registering the first and second images based on correspondences between a first plurality of control points representing the physiological model estimated in the first image and a second plurality of control points representing the physiological model estimated in the second image.

2. The method of claim 1, wherein the physiological model estimated in each of the first image and the second image is generated based on a mathematical representation of the target anatomic structure in a set of annotated training data.

3. The method of claim 1, wherein said step of independently estimating a respective physiological model of a target anatomical structure in each of a first image and a second image comprises:
   fitting the respective physiological model to each of the first and second images using discriminative machine-learning based estimation.

4. The method of claim 3, wherein said step of fitting the respective physiological model to each of the first and second image using discriminative machine-learning based estimation comprises:
   estimating a position, orientation, and scale of the respective physiological model in each of the first and second images using marginal space learning (MSL) with a discriminative classifiers trained based on annotated training data.

5. The method of claim 4, wherein said step of independently estimating a respective physiological model of a target anatomical structure in each of a first image and a second image further comprises:
   refining the respective estimated physiological model in each of the first and second images using learning-based boundary detection.

6. The method of claim 1, wherein said step of generating a fused image by registering the first and second images based on correspondences between a first plurality of control points representing the physiological model estimated in the first image and a second plurality of control points representing the physiological model estimated in the second image comprises:
   estimating a transformation between corresponding ones of the first plurality of control points of the physiological model estimated in the first image and the second plurality of control points of the physiological model estimated in the second image.

7. The method of claim 6, wherein said step of estimating a transformation between corresponding ones of the first plurality of control points of the physiological model estimated in the first image and the second plurality of control points of the physiological model estimated in the second image comprises:
   estimating the transformation using a thin-plate-spline transformation.

8. The method of claim 1, wherein said first and second images are generated using different imaging modalities.

9. The method of claim 1, wherein the second image is a dynamic image sequence comprising a plurality of frames received in real-time during a medical procedure and said step of independently estimating a respective physiological model of a target anatomical structure in each of a first image and a second image comprises:
   estimating the physiological model of the target anatomic structure in the first image in advance of the medical procedure to generate a patient specific physiological model of the target anatomic structure; and
   estimating the patient specific physiological model of the target anatomic structure in each frame of said dynamic image sequence in real-time during the medical procedure as each frame of said dynamic image sequence is received.

10. The method of claim 9, wherein said step of generating a fused image by registering the first and second images based on correspondences between a first plurality of control points representing the physiological model estimated in the first image and a second plurality of control points representing the physiological model estimated in the second image comprises:
    registering the first image and each frame of said dynamic image sequence in real time during the medical procedure based on correspondences between the first plurality of control points of the patient specific physiological model of the target anatomic structure estimated in the first image and the second plurality of control points of the patient-specific physiological model estimated in each frame of said dynamic image sequence.

11. The method of claim 9, wherein the first image is one of a computed tomography (CT) image and a magnetic resonance (MR) image of the target anatomic structure and the second image is an ultrasound image of the target anatomic structure.

12. The method of claim 1, wherein the first image is a cardiac computed tomography (CT) image, the second image is a Doppler echocardiography image, and the physiological model is a physiological model one or more heart chambers.

13. The method of claim 1, wherein the first and second images are images of a region of interest of a patient generated using the same imaging modality at different times during a particular medical treatment on a particular region of interest, and said step of generating a fused image by registering the first and second images based on correspondences between a first plurality of control points representing the physiological model estimated in the first image and a second plurality of control points representing the physiological model estimated in the second image comprises:

registering the first and second images based on correspondences between corresponding ones of the first plurality of control points and the second plurality of control points on a portion of the physiological model not affected by the treatment in each of the first and second images.

14. An apparatus for physiological registration and fusion of multiple images, comprising:

means for independently estimating a respective physiological model of a target anatomical structure in each of a first image and a second image; and means for generating a fused image by registering the first and second images based on correspondences between a first plurality of control points representing the physiological model estimated in the first image and a second plurality of control points representing the physiological model estimated in the second image.

15. The apparatus of claim 14, wherein the physiological model estimated in each of the first image and the second image is generated based on a mathematical representation of the target anatomic structure in a set of annotated training data.

16. The apparatus of claim 15, wherein said means for independently estimating a respective physiological model of a target anatomical structure in each of a first image and a second image comprises:

means for fitting the respective physiological model to each of the first and second images using discriminative machine-learning based estimation.

17. The apparatus of claim 14, wherein said means for generating a fused image by registering the first and second images based on correspondences between a first plurality of control points representing the physiological model estimated in the first image and a second plurality of control points representing the physiological model estimated in the second image comprises:

means for estimating a transformation between corresponding ones of the first plurality of control points of the physiological model estimated in the first image and the second plurality of control points of the physiological model estimated in the second image.

18. The apparatus of claim 14, wherein said first and second images are generated using different imaging modalities.

19. The apparatus of claim 14, wherein the second image is a dynamic image sequence comprising a plurality of frames received in real-time during a medical procedure and said means for independently estimating a respective physiological model of a target anatomical structure in each of a first image and a second image comprises:

means for estimating the physiological model of the target anatomic structure in the first image in advance of the medical procedure to generate a patient specific physiological model of the target anatomic structure; and means for estimating the patient specific physiological model of the target anatomic structure in each frame of said dynamic image sequence in real-time during the medical procedure as each frame of said dynamic image sequence is received.

20. The apparatus of claim 19, wherein said means for generating a fused image by registering the first and second images based on correspondences between a first plurality of control points representing the physiological model estimated in the first image and a second plurality of control points representing the physiological model estimated in the second image comprises:

means for registering the first and second images based on correspondences between corresponding ones of the first plurality of control points and the second plurality of control points on a portion of the physiological model not affected by the treatment in each of the first and second images.

21. A non-transitory computer readable medium encoded with computer executable instructions for physiological registration and fusion of multiple images, the computer executable instructions defining steps comprising:

independently estimating a respective physiological model of a target anatomical structure in each of a first image and a second image; and generating a fused image by registering the first and second images based on correspondences between a first plurality of control points representing the physiological model estimated in the first image and a second plurality of control points representing the physiological model estimated in the second image.

22. The non-transitory computer readable medium of claim 21, wherein the physiological model estimated in each of the first image and the second image is generated based on a mathematical representation of the target anatomic structure in a set of annotated training data.

23. The non-transitory computer readable medium of claim 21, wherein the computer executable instructions defining the step of independently estimating a respective physiological model of a target anatomical structure in each of a first image and a second image comprise computer executable instructions defining the step of:

fitting the respective physiological model to each of the first and second images using discriminative machine-learning based estimation.

24. The non-transitory computer readable medium of claim 21, wherein the computer executable instructions defining the step of generating a fused image by registering the first and second images based on correspondences between a first plurality of control points representing the physiological model estimated in the first image and a second plurality of control points representing the physiological model estimated in the second image comprise computer executable instructions defining the step of:

estimating a transformation between corresponding ones of the first plurality of control points of the physiological model estimated in the first image and the second plurality of control points of the physiological model estimated in the second image.

25. The non-transitory computer readable medium of claim 21, wherein said first and second images are generated using different imaging modalities.

26. The non-transitory computer readable medium of claim 21, wherein the second image is a dynamic image sequence comprising a plurality of frames received in real-time during a medical procedure and the computer executable instructions defining the step of independently estimating a respective physiological model of a target anatomical structure in each of a first image and a second image comprise computer executable instructions defining the steps of:

estimating the physiological model of the target anatomic structure in the first image in advance of the medical procedure to generate a patient specific physiological model of the target anatomic structure; and     estimating the patient specific physiological model of the target anatomic structure in each frame of said dynamic image sequence in real-time during the medical procedure as each frame of said dynamic image sequence is received.

27. The non-transitory computer readable medium of claim 26, wherein the computer executable instructions defining the step of generating a fused image by registering the first and second images based on correspondences between a first plurality of control points representing the physiological model estimated in the first image and a second plurality of control points representing the physiological model estimated in the second image comprise computer executable instructions defining the step of:

registering the first and second images based on correspondences between corresponding ones of the first plurality of control points and the second plurality of control points on a portion of the physiological model not affected by the treatment in each of the first and second images.

28. The non-transitory computer readable medium of claim 21, wherein the first and second images are images of a region of interest of a patient generated using the same imaging modality at different times during a particular medical treatment on a particular region of interest, and the computer executable instructions defining the step of generating a fused image by registering the first and second images based on correspondences between a first plurality of control points representing the physiological model estimated in the first image and a second plurality of control points representing the physiological model estimated in the second image comprise computer executable instructions defining the step of:

registering the first and second images based on correspondences between corresponding ones of the first plurality of control points and the second plurality of control points on a portion of the physiological model not affected by the treatment in each of the first and second images.

\* \* \* \* \*